United States Patent
Soga et al.

(10) Patent No.: US 6,490,790 B1
(45) Date of Patent: Dec. 10, 2002

(54) METHOD OF MANUFACTURING PREFORM FOR CONNECTING ROD

(75) Inventors: Ryuji Soga, Tochigi-ken (JP); Shuichi Yamane, Tochigi-ken (JP); Hiroshi Sugita, Tochigi-ken (JP); Kimio Momose, Saitama-ken (JP); Yoshiro Akiyama, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 35 days.

(21) Appl. No.: 09/678,103

(22) Filed: Oct. 4, 2000

(30) Foreign Application Priority Data

Nov. 26, 1999 (JP) .......................... 11-336298
Nov. 26, 1999 (JP) .......................... 11-336300

(51) Int. Cl.$^7$ ................................ F16C 7/02
(52) U.S. Cl. ..................... 29/888.09; 29/888.092; 29/557; 72/355.6
(58) Field of Search ................. 29/888.09, 888.092, 29/557, DIG. 18; 72/355.6, 356, 535.2, 260

(56) References Cited

U.S. PATENT DOCUMENTS

| | | | | | |
|---|---|---|---|---|---|
| 2,169,894 | A | * | 8/1939 | Criley | 29/888.09 |
| 3,036,366 | A | * | 5/1962 | Ricks | 29/888.09 |
| 3,314,277 | A | * | 4/1967 | Hopkins et al. | 72/356 |
| 3,651,683 | A | * | 3/1972 | Liebergeld | 72/356 |
| 4,425,774 | A | * | 1/1984 | Shinozaki et al. | 72/257 |
| 5,127,253 | A | * | 7/1992 | Takahara et al. | 72/356 |
| 5,524,507 | A | | 6/1996 | Olmr et al. | 74/479 E |
| 6,134,779 | A | | 10/2000 | Walker et al. | 29/888.092 |
| 6,257,041 | B1 | * | 7/2001 | Duggan | 29/888.09 |

FOREIGN PATENT DOCUMENTS

| | | | |
|---|---|---|---|
| DE | 3504410 A1 | 10/1986 | |
| JP | 360102246 A * | 6/1985 | 29/888.092 |
| JP | 361037341 A * | 2/1986 | 72/356 |
| JP | 61-137640 | 6/1986 | |
| JP | 4-327315 | 11/1992 | |
| JP | 404327314 A * | 11/1992 | 72/260 |
| JP | 7-100576 | 4/1995 | |

\* cited by examiner

*Primary Examiner*—S. Thomas Hughes
*Assistant Examiner*—Jermie E. Cozart
(74) *Attorney, Agent, or Firm*—Armstrong Westerman & Hattori, LLP (57) ABSTRACT

A preform for a connecting rod of an engine is manufactured with a good productivity. The preform has a large-end mass portion which corresponds to a large-end portion of the connecting rod, a small-end mass portion which corresponds to a small-end portion thereof, and a shaft portion which corresponds to a rod portion thereof. There is manufactured a preform blank which has a shaft-shaped portion which is formed by extrusion. This shaft-shaped portion is made up of the shaft portion and an extended portion which extends axially forward from the shaft portion. The small-end mass portion is formed by squeezing the extended portion in the axial direction in a plurality of times starting with a portion near the shaft portion.

2 Claims, 6 Drawing Sheets

METHOD OF MANUFACTURING PREFORM FOR CONNECTING ROD

BACKGROUND OF THE INVENTION

1. Field of the Invention

The present invention relates to a method of manufacturing a preform for a connecting rod of an engine. The connecting rod has a large-end portion, a small-end portion, and a rod portion which lies between the large-end portion and the small-end portion. The preform is used as a raw material (or a blank) in forming the connecting rod by means of forging.

2. Description of Related Art

As a method of manufacturing a connecting rod of an engine, there has hitherto been known the following in Published Unexamined Japanese Patent Application No. 137640/1986. Namely, in the method, a preform having a shaft portion corresponding to the rod portion of the connecting rod, that large-end mass portion on one end of the shaft portion which corresponds to the large-end portion thereof, and that small-end mass portion on the opposite end of the shaft portion which corresponds to the small-end portion thereof is set inside a die of a forging die apparatus. The connecting rod is thus formed by forging. The preform is normally manufactured by swaging.

Forming by the process of swaging is sequentially performed while either a die or a blank is rotated. The preform for a connecting rod has a large difference in diameters between the large-end mass portion and the shaft portion. Therefore, there is a disadvantage in that the forming takes time and that the equipment becomes large in size.

In view of the above points, the present invention has an object of providing a method of manufacturing a preform for a connecting rod of an engine, in which the productivity can be improved.

SUMMARY OF THE INVENTION

In order to attain the above and other objects, the present invention is a method of manufacturing a preform for a connecting rod of an engine, the connecting rod having a large-end portion, a small-end portion, and a rod portion between the large-end portion and the small-end portion, the preform being used for forging the connecting rod and having a shaft portion corresponding to the rod portion, that large-end mass portion on one end of the shaft portion which corresponds to the large-end portion, and that small-end mass portion on the other end of the shaft portion which corresponds to the small-end portion, the method comprising the steps of: forming a preform blank comprising the large-end mass portion and a shaft-shaped portion, the shaft-shaped portion being formed by extrusion and including the shaft portion and an extended portion which extends axially forward from the shaft portion; and forming the small-end mass portion by squeezing the extended portion in the axial direction.

According to the present invention, the shaft portion which has a large difference in diameter relative to the large-end mass portion is formed by extrusion together with the extended potion which is converted into the small-end mass portion. Therefore, the forming of the shaft portion does not take much time and, therefore, the productivity of the preform is improved.

The upsetting ratio of the small-end mass portion (axial length of the extended portion required for forming the small-end mass portion/diameter of the extended portion) becomes relatively large. Therefore, at the time of squeezing, the extended portion is likely to give rise to buckling. Since buckling becomes the cause for poor forming such as the presence of biased material thicknesses, folds, or the like, it is preferable to prevent the occurrence of buckling. In this case, if the step of forming the small-end mass portion comprises squeezing the extended portion in a plurality of times starting with a portion near the shaft portion, the upsetting ratio per one time (length of squeezing of the extended portion/diameter of the extended portion) becomes small. As a result, the occurrence of buckling can be prevented, and the small-end mass portion can be formed at a higher accuracy.

The conventional large-end mass portion and the small-end mass portion are formed into a sphere or a circular column. This kind of preform is, however, poor in sitting stability. Therefore, the preform is likely to roll (or move) inside the die of the forging die apparatus out of an ordinary set position. Biased material thicknesses will thus occur due to this positional deviation, resulting in a poor forming accuracy of the connecting rod. As a solution, it is preferable in the step of forming the preform blank, the large-end mass portion is formed into a noncircular cross section having flat surfaces which are parallel with an axial line of the shaft portion, the flat surfaces being formed in a part along an outer periphery of the large-end mass portion. According to this arrangement, when the preform is set inside the die of the forging die apparatus, the flat surface of the large-end mass portion is caused to sit on the die surface. The preform is thus prevented from rolling inside the die. As a result, the biased material thicknesses due to the positional deviation of the preform can be prevented.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1A:
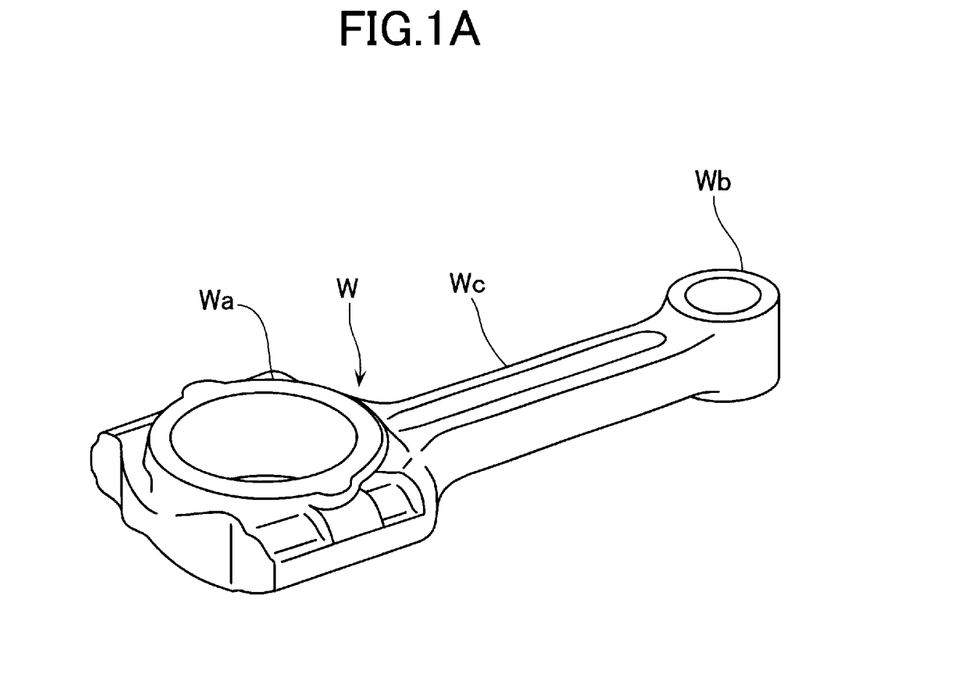
FIG. 1A is a perspective view of a connecting rod and FIG. 1B is a perspective view of a preform.
Figure 1B:
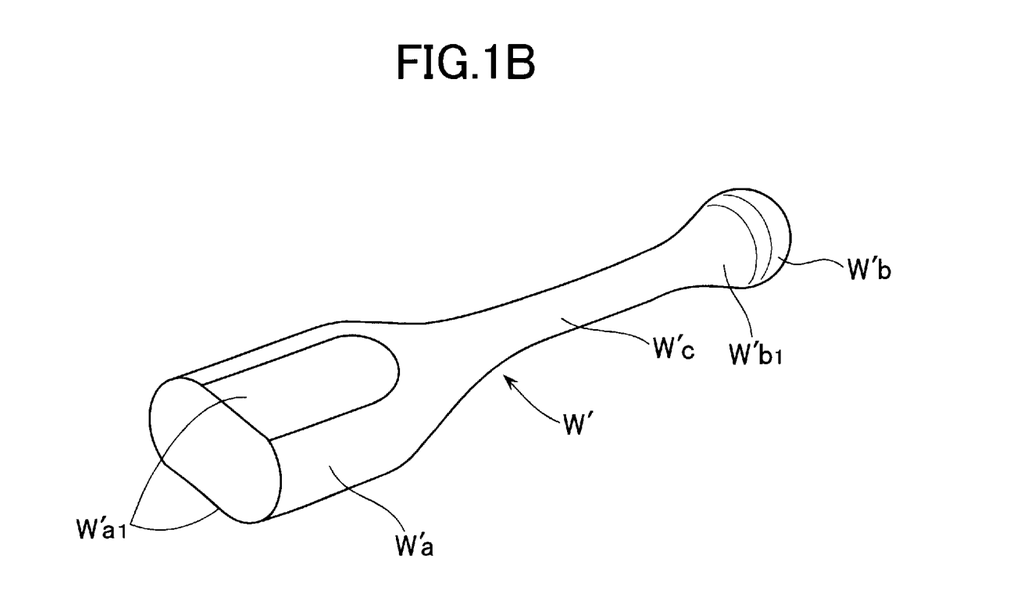

FIG. 1A shows that connecting rod W of an engine which is made up of: a large-end portion Wa which serves as a connecting portion to a crank pin of the engine; a small-end portion Wb which serves as a connecting portion to a piston pin; and a rod portion Wc which lies between both the large-end portion Wa and the small-end portion Wb. This connecting rod W is manufactured by cold full-enclosed die forging out of a blank (or a raw material) in the form of a preform W' as shown in FIG. 1B by means of a forging die apparatus as shown in FIG. 2.

The preform W' is made up of: a shaft portion W'c which corresponds to the rod portion Wc of the connecting rod W; that large-end mass portion W'a on one end of the shaft portion W'c which corresponds to the large-end portion Wa thereof; and that small-end mass portion W'b on the other end of the shaft portion W'c which corresponds to the small-end portion Wb thereof. The volume ratio among the large-end mass portion W'a, the small-end mass portion W'b, and the shaft portion W'c is set to approximately the same volume ratio among the large-end portion Wa, the small-end portion Wb, and the rod portion Wc.

The forging die apparatus is made up of: an upper die 1 which is a movable die; a lower die 2 which is a fixed die; and an intermediate die 3 which has formed therein a forming hole 3a which coincides with the contour of the connecting rod W. On top of a die ring 4 which encloses the lower die 2, there is provided a guide ring 5 to guide the upper die 1. By means of this guide ring 5, the intermediate die 3 is forced against the lower die 2. The upper die 1 and the lower die 2 are respectively provided with large-end punches $6_1$, $6_2$ and small-end punches $7_1$, $7_2$ in a manner to be movable up and down.

Figure 2A:
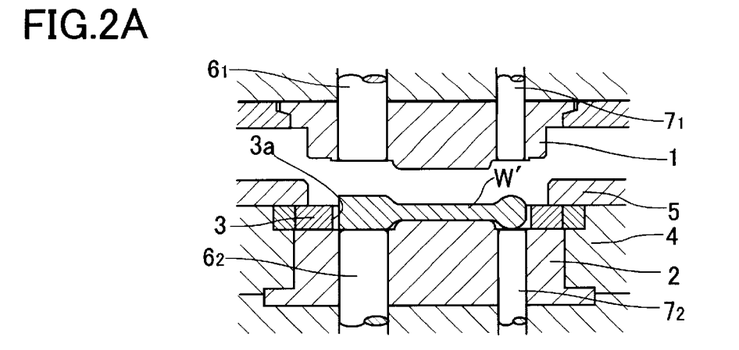
FIG. 2A is a sectional view showing the state of a forging die apparatus for the connecting rod before starting the forging.
Figure 2B:
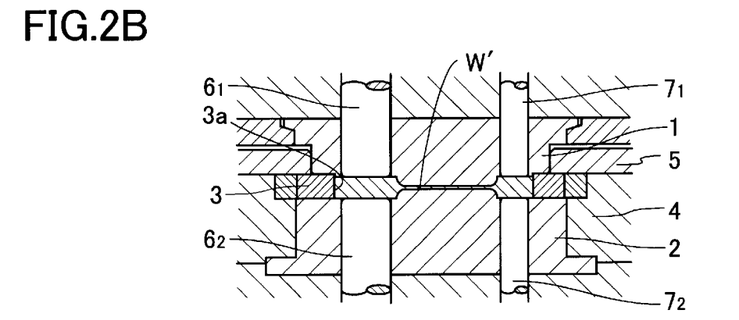
FIG. 2B is a sectional view of the above-described forging die apparatus at the time of completing the first stage of forging.
Figure 2C:
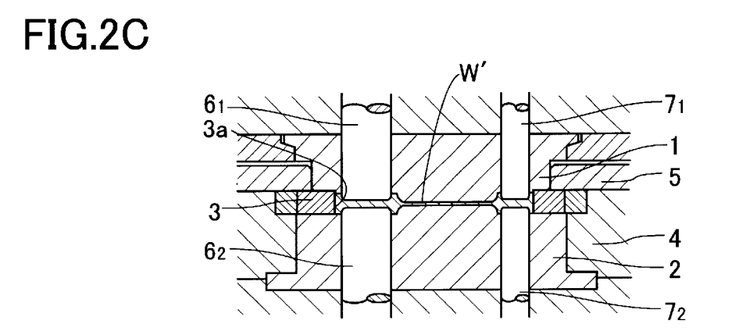
FIG. 2C is a sectional view of the above-described forging die apparatus at the time of completing the second stage of forging.
Figure 2D:
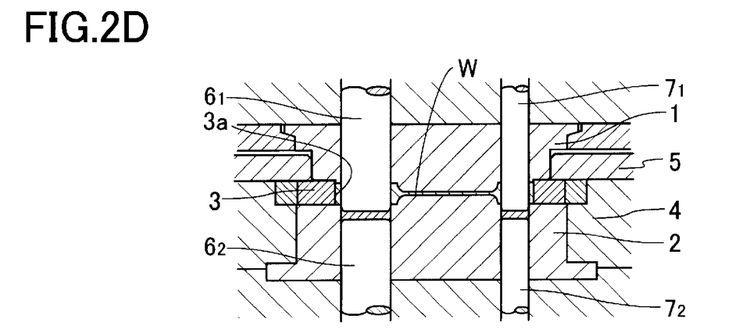
FIG. 2D is a sectional view of the above-described forging die apparatus at the time of completion of forging.

In manufacturing the connecting rod W, the following steps are taken. Namely, as shown in FIG. 2A, a preform W' is set on the lower die 2 so as to be positioned inside the forming hole 3a in the intermediate die 3. Then, as shown in FIG. 3B, the upper die 1 is lowered to close the die apparatus, whereby the first step of forging of the preform W' is performed. Then, as shown in FIG. 2C, the punches $6_1$, $7_1$ on the side of the upper die 1 are forced down and, also, the punches $6_2$, $7_2$ on the side of the lower die 1 are forced up, whereby the second step of forging is performed. According to these operations, the portion to be pierced in the large-end portion Wa and the portion to be pierced in the small-end portion Wb of the connecting rod W are forged. The material flows into underfilled parts which are left in a forming space to be defined by the upper die 1, the lower die 2, and the intermediate die 3, whereby the underfills (or underfilled parts) are filled with the material. There is thus formed a connecting rod W which has a side configuration coinciding with each of the upper and lower dies 1, 2 as well as a contour configuration coinciding with the intermediate die 3. Then, the upward forcing of the punches $6_2$, $7_2$ on the side of the lower die 2 is released while the downward forcing of the punches $6_1$, $7_1$ on the side of the upper die 1 is continued. As a result, as shown in FIG. 2D, the pads left between the large-end punches $6_1$, $6_2$ and the pads left between the small-end punches $7_1$, $7_2$ are punched out to thereby pierce the large-end portion Wa and the small-end portion Wb.

If the preform W' which is set in the lower die 2 rolls to thereby deviate in position, there will occur biased or uneven material thicknesses in the process of forging, with the result that the forming accuracy of the connecting rod W becomes poor. As a solution, in the present embodiment, the large-end mass portion W'a of the preform W' is formed into a noncircular shape having, on a part along its circumference, flat surfaces $W'a_1$ which are parallel with an axial line of the shaft portion W'c, e.g., into an oblong cross section having a pair of opposite flat surfaces $W'a_1$. According to this arrangement, by setting the preform W' such that the flat surface $W'a_1$ is seated onto the lower die 2, the preform W' will no longer roll over the lower die 2. The preform W' can thus be prevented from becoming poor in the forming accuracy due to the positional deviation of the preform W'.

Figures 3A, 3B, 3C:
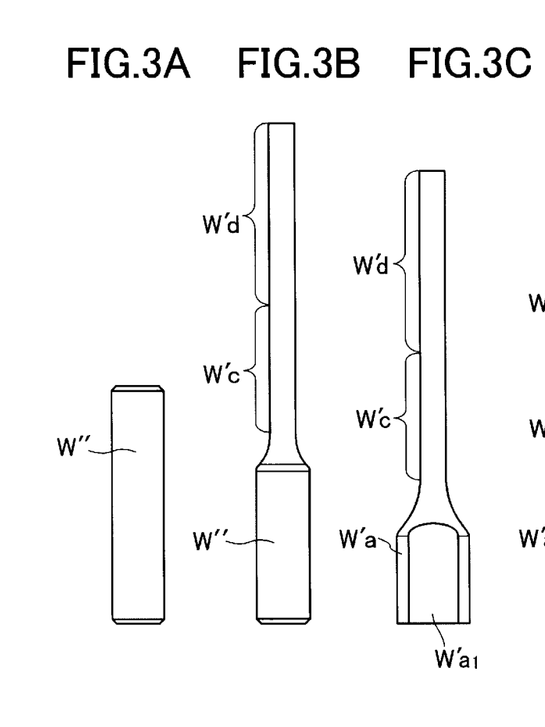
FIGS. 3A–3H are process diagrams showing one example of manufacturing the preform according to the present invention.
Figures 3D, 3E, 3F:
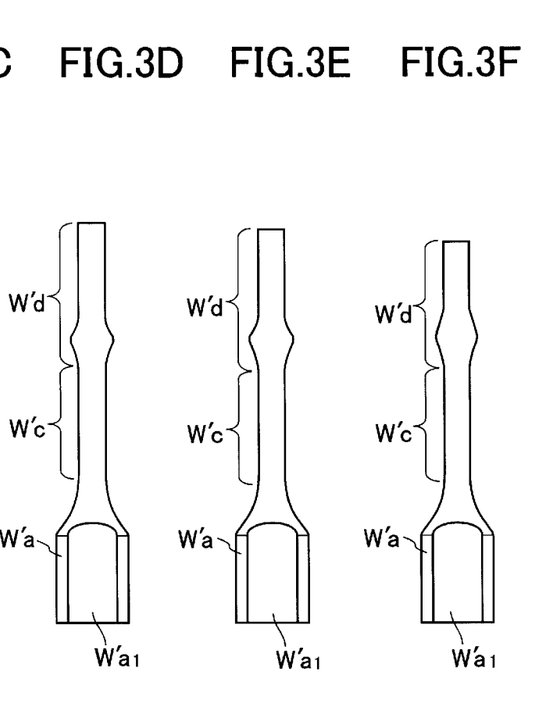
Figures 3G, 3H:
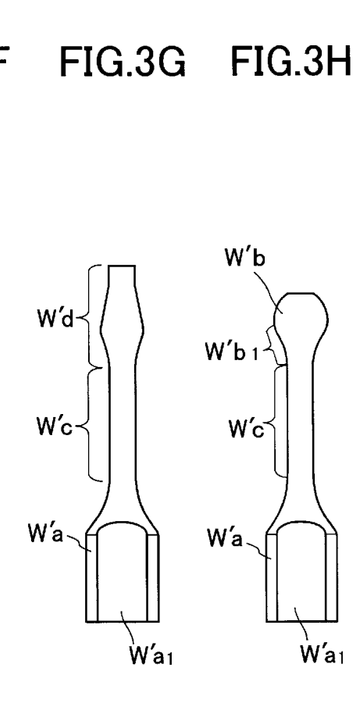

The preform W' is manufactured from a billet W" of a round bar shape as shown in FIG. 3A. In more detail, first, as shown in FIG. 3B, there is extruded from a billet W" a shaft-shaped portion which is made up of the shaft portion W'c and an extended portion W'd which extends axially forward from the shaft portion W'c by a length equivalent to the volume of the small-end mass portion W'b. Then, a non-extruded portion of the billet W" is formed by upsetting. In this manner, a preform blank which has the above-described shaft-shaped portion and the large-end mass portion W'a as shown in FIG. 3C is manufactured. The large-end mass portion W'a is formed by this upsetting processing into the noncircular cross section as described above. Then, the extended portion W'd of the preform blank is squeezed, as shown in FIGS. 3D–3H, from the portion near the shaft portion W'c in the axial direction separately in a plurality of times, to thereby form the small-end mass portion W'b.

Figure 4:
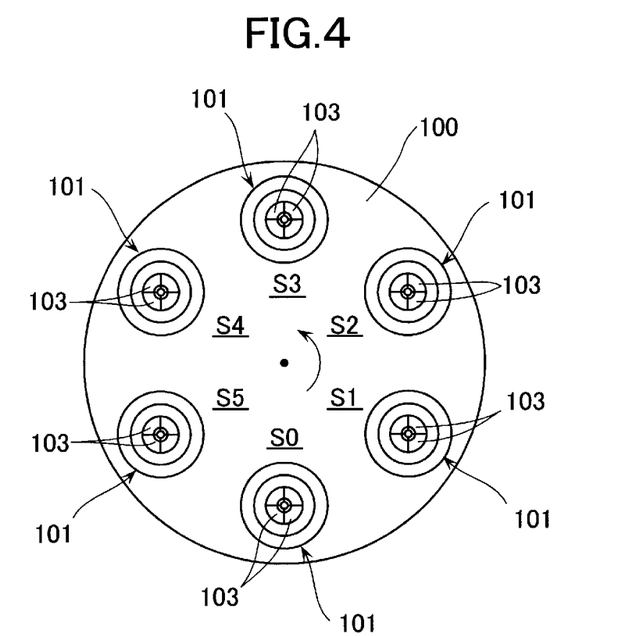
FIG. 4 is a plan view of the lower half of the apparatus to be used in practicing the present invention.
Figure 5:
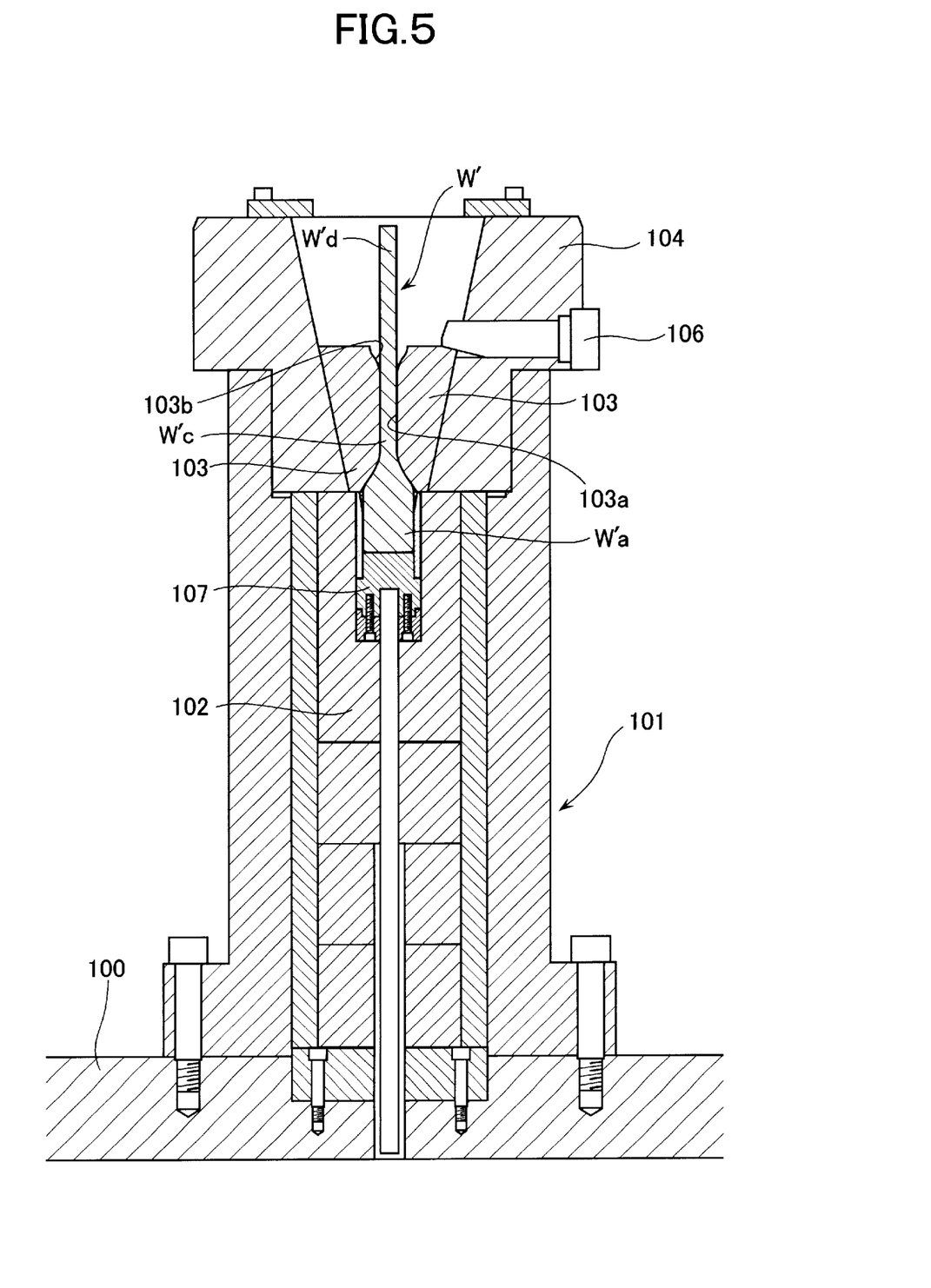
FIG. 5 is a sectional view of the lower die to be used in the apparatus of FIG. 4.
Figure 6:
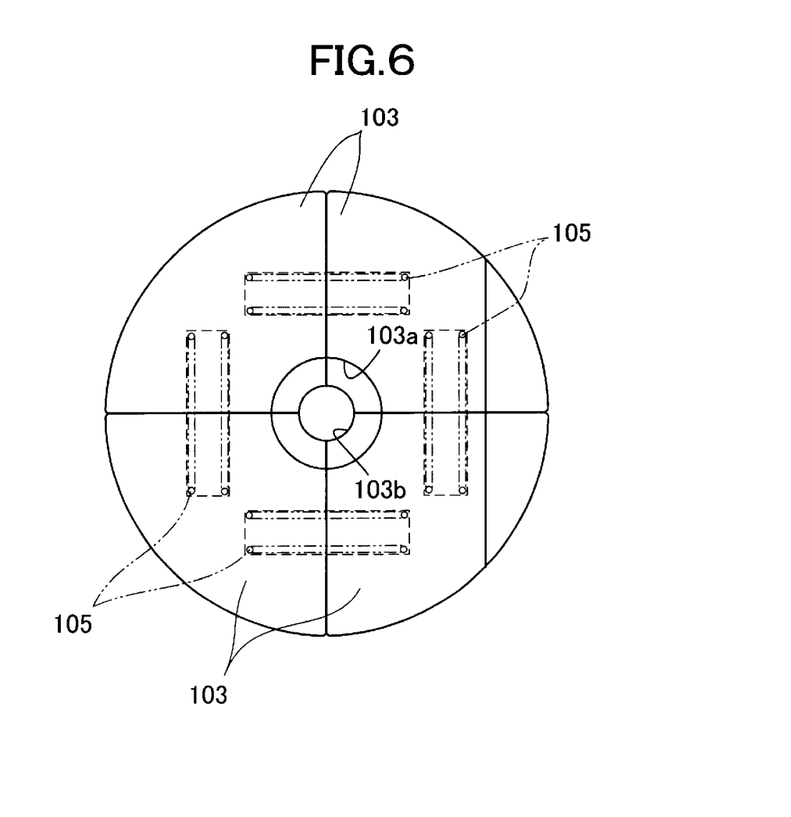
FIG. 6 is a plan view of segmented dies to be provided in the lower die.

The steps shown in FIGS. 3D–3H are performed by means of a rotary type of pressing apparatus, as shown in FIG. 4, in which are disposed a plurality of lower dies 101 at an equal pitch on a turn table 100. Each of the lower dies 101 is provided, as shown in FIGS. 5 and 6, with: a die main body 102 into which the large-end mass portion W'a of the preform blank can be set by insertion from an upper side; and a plurality of segmented dies 103 (four dies in the embodiment) which are disposed on the die main body 102 so as to be radially opened and closed. Each of the segmented dies 103 has a chucking portion 103a which restrains the shaft portion W'c; and a forming portion, on an upper end thereof, which coincides with the shape of an undercut portion $W'b_1$ which lies on the side of the shaft portion W'c of the small-end mass portion W'b. In addition, the segmented dies 103 are contained inside a tapered cone 104 which enlarges or expands toward the upper end and which is disposed on an upper outer periphery or edge of the die main body 102. Between each set of the segmented dies 103, there is contained a spring 105 in a contracted manner. When the segmented dies 103 are forced down inside the tapered cone 104, the segmented dies 103 are closed against the urging forces of the springs 105. The segmented dies 103 are then locked in a closed state by a locking pin 106 which is provided by insertion into the tapered cone 104. The die main body 102 is further provided with a knockout 107. In a state in which the locking by the locking pin 106 is released, the knockout 107 is moved up. By this operation, the segmented dies 103 and the preform W' are pushed up to thereby open the dies.

In the pressing apparatus, there are disposed the following six stations in total at an interval of 60° along the locus of rotation of the lower die 102, the six stations being a mounting and dismounting station SO and a first through a fifth forging stations S1–S5. By an intermittent rotation of the turntable 100 by 60° each time, the lower die 101 is sequentially fed from the mounting and dismounting station SO to the first through the fifth forging stations S1–S5 and is returned back to the mounting and dismounting station SO.

Figure 7A:
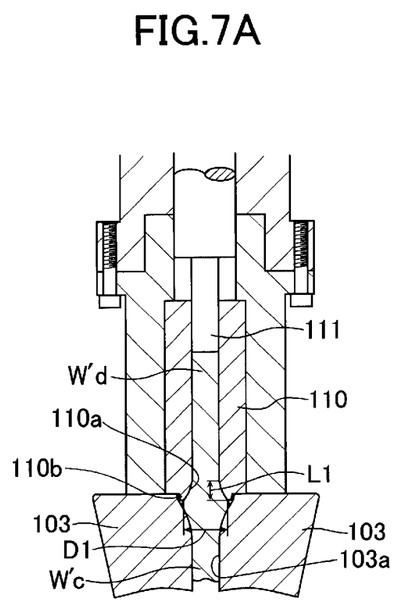
FIG. 7A is a sectional view showing the state of forming in the first forging station.
Figure 7B:
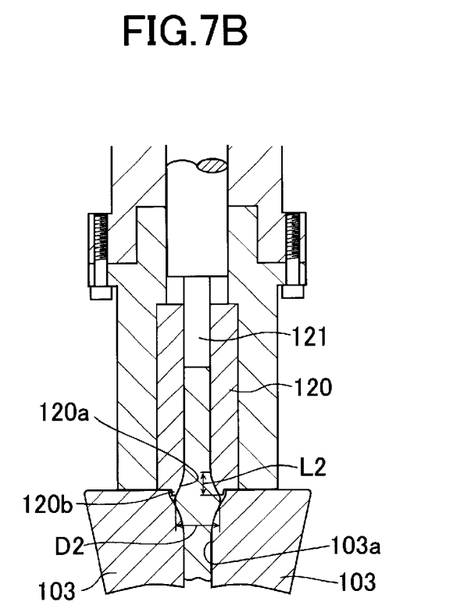
FIG. 7B is a sectional view showing the state of forming in the second forging station.
Figure 7C:
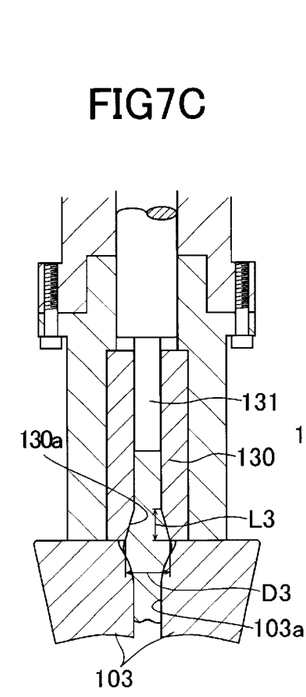
FIG. 7C is a sectional view showing the state of forming in the third forging station.
Figure 7D:
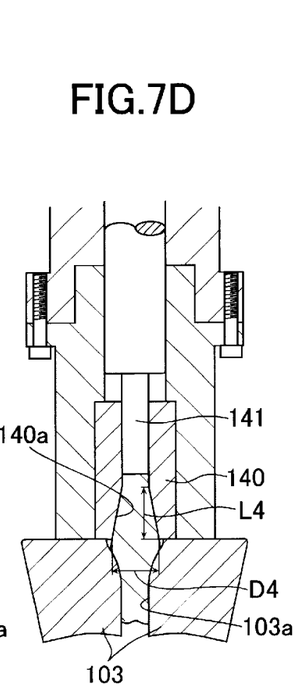
FIG. 7D is a sectional view showing the state of forming in the fourth forging station.
Figure 7E:
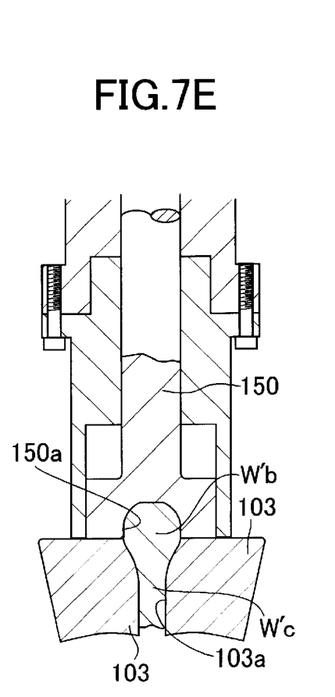
FIG. 7E is a sectional view showing the state of forming in the fifth forging station.

As shown in FIGS. 7A–7D, in the first through the fourth forging stations S1–S4, there are disposed: vertically movable upper dies 110, 120, 130, 140 which are fitted onto an outside of the extended portion W'd of the preform blank to be held in the lower die 101; and punches 111, 121, 131, 141 which are vertically movable relative to the upper dies and which forge the extended portion W'd from an upper side. In the fifth forging station S5, there is disposed, as shown in FIG. 7E, a vertically movable upper punch 150 which has a downwardly open forming portion 150a which coincides with a portion of the small-end mass portion W'b other than the undercut portion W'b$_1$ thereof.

On a lower internal circumference of each of the upper dies 110, 120, 130, 140, there is formed an expanded (or tapered) portion 110a, 120a, 130a, 140a which expands in the downward direction. The relationship among the axial length L1 and the diameter D1 of the expanded portion 110a of the upper die 110 to be disposed in the first forging station S1, the axial length L2 and the diameter D2 of the expanded portion 120a of the upper die 120 to be disposed in the second forging station S2, the axial length L3 and the diameter D3 of the expanded portion 130a of the upper die 130 to be disposed in the third forging station S3, and the axial length L4 and the diameter D4 of the expanded portion 140a of the upper die 140 to be disposed in the fourth forging station S4 is arranged to be L1<L2<L3<L4 and D1<D2<D3<D4. In addition, on the lower end of the upper die 110, 120 to be disposed in the first and the second forging station S1, S2, there is respectively formed an annular projection 110b, 120b which is formed so that the annular projection 110b, 120b enters into the forming portion 103b of the segmented dies 103b.

In forming the small-end mass portion W'b, the following steps are taken. Namely, first, in the mounting and dismounting station SO, the large-end mass portion W'a of the preform blank is inserted into the die main body 102 of the lower die 101. Then, the segmented dies 103 are closed and are locked in this state by the locking pin 106. The shaft portion W'c of the preform blank is restrained by the chucking portion 103a of the segmented dies 103.

The lower die 101 is then sent to the first forging station S1. In the first forging station S1, the upper die 110 is fitted onto an outer surface of the extended portion W'd of the preform blank, and the extended portion W'd is forged by the punch 111 from an upper side. According to these operations, the extended portion W'd is axially squeezed such that the material expands into the upsetting space which is defined by the forming portion 103b of the segmented dies 103 and the expanded portion 110a of the upper die 110. Thereafter, the squeezing of the extended portions W'd continues also in the second through the fourth forging stations S2–S4. Since the axial lengths and the diameters of the expanded portions 110a, 120a, 130a, 140a of the upper dies 110, 120, 130, 140 to be disposed in the first through the fourth stations are formed with the dimensional differences as noted above, the expanded portion W'd is squeezed, in the first through the fourth stations S1–S4, stepwise starting with the portion near the shaft portion W'c. Finally, the small-end mass portion W'b is formed in the fifth station S5 by forging with the upper punch 150. Therefore, the upsetting ratio (squeezed length of the extended portion W'd/diameter of the extended portion W'd) in each of the forging stations S1 through S5 becomes small. As a result, the buckling at the time of squeezing can be restrained. The small-end mass portion W'b is thus formed while the poor forming by the biased material thicknesses, folds, or the like are prevented.

In the first and the second forging stations S1, S2, the internal volume of the forming portion 103b of the segmented dies 103 is large. Therefore, there is a possibility that the upsetting ratio becomes excessive to thereby cause buckling. In the present embodiment, however, there are formed the annular projections 110b, 120b in the upper dies 110, 120 as described hereinabove. Therefore, the substantial internal volume of the forming portion 103b is reduced by the annular projections 110b, 120b. As a result, the upsetting ratio in the first and the second forging stations S1, S2 becomes small and the occurrence of buckling can be prevented.

When the lower die 101 is returned to the mounting and dismounting station SO after the small-end mass portion W'b has been formed, the locking by the locking pin 106 is released to thereby move the knockout 107 upward. The formed preform W' is taken out of the lower die 101 and the next preform blank is set in the lower die 101. By repeating the above-described operations, the preform W' can be continuously manufactured.

It is readily apparent that the above-described method of manufacturing a preform for a connecting rod of an engine meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of manufacturing a preform for a connecting rod of an engine, said connecting rod having a large-end portion, a small-end portion, and a rod portion between said large-end portion and said small-end portion, said preform being used for forging the connecting rod and having a shaft portion corresponding to said rod portion a large-end mass portion on one end of said shaft portion which corresponds to said large-end portion, and a small-end mass portion on the other end of said shaft portion which corresponds to said small-end portion, said method comprising the steps of:

forming a preform blank comprising said large-end mass portion and a shaft-shaped portion, said shaft-shaped portion being formed by extrusion and including said shaft portion and an extended portion which extends axially forward from said shaft portion; and forming said small-end mass portion by squeezing said extended portion of said preform blank in an axial direction, a plurality of times starting from a portion near said shaft portion by a plurality of pressing tools;

wherein each of said plurality of pressing tools comprises:

a segmented die restraining said shaft portion of said preform blank and having a forming portion which coincides with the shape of an undercut portion which lies on a side of the shaft portion of the small-end mass portion;

an upper die which is fitted onto an outside of the extended portion of the preform blank and on a lower internal circumference of which an expanded portion is formed; and a punch which forges the preform blank such that material expands into a upsetting space which is defined by the forming portion of the segmented die and the expanded portion of the upper die;

in which said expanded portion of said plurality of pressing tools are different from each other with respect to axial length and diameter, and said plurality of pressing tools are used in order starting with a respective one of said pressing tools which has an expanded portion having the shortest axial length and diameter.

2. The method according to claim 1, wherein, in said step of forming said preform blank, said large-end mass portion is formed into a noncircular cross section having flat surfaces which are parallel with an axial line of said shaft portion, said flat surfaces being formed in a part along an outer periphery of said large-end mass portion.

* * * * *